Patented Nov. 12, 1946

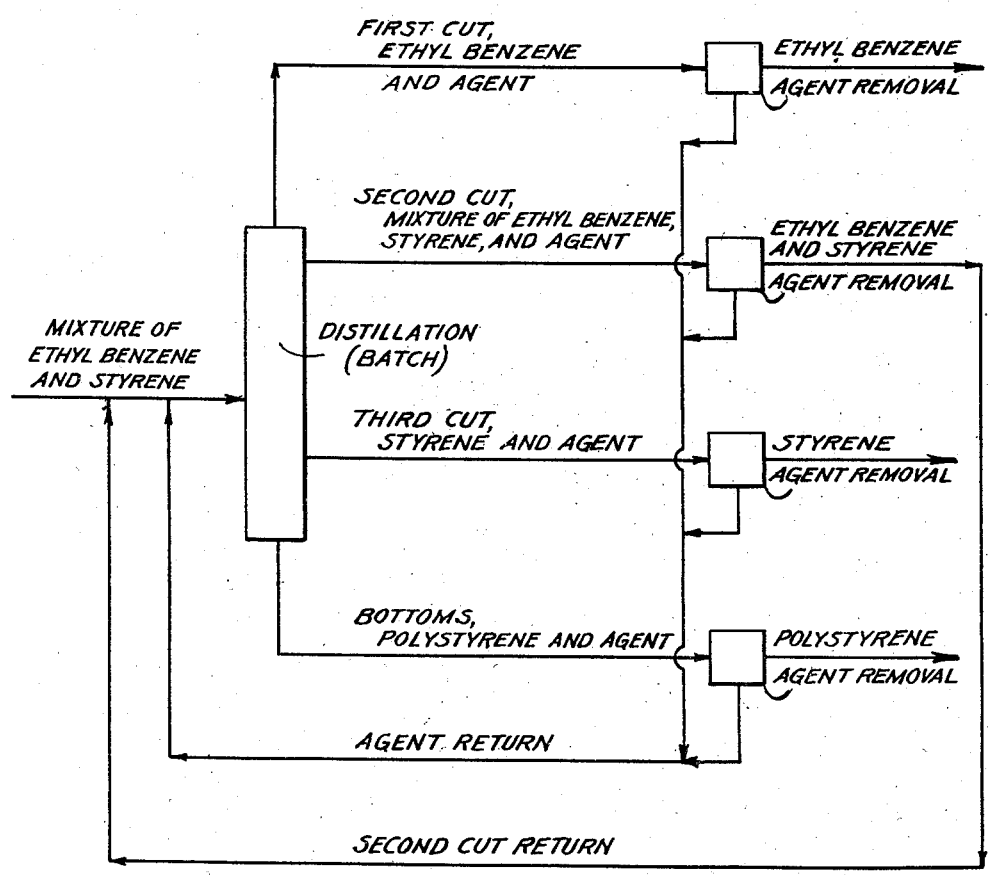

2,411,106

UNITED STATES PATENT OFFICE 2,411,106

SEPARATION OF STYRENE FROM ETHYL BENZENE BY AZEOTROPIC DISTILLATION

Theodor A. Petry, Wenonah, and Grady L. Payne, Clarksboro, N. J., assignors to Socony-Vacuum Oil Company, Incorporated, a corporation of New York Application July 1, 1942, Serial No. 449,358

5 Claims. (Cl. 202—42)

1

This invention has to do with the separation of styrene in relatively pure form from crude mixtures containing the same.

Styrene finds uses in the synthesis of a number of organic chemicals and polymerization products and is of particular interest in connection with certain forms of synthetic rubber. For most of these uses the styrene must be in a relatively pure state and substantially without polymerized derivatives present. Crude styrene is normally contaminated with appreciable quantities of materials of similar boiling points and fairly closely related chemical structure such as, for example, ethyl benzene. Upon this account and also because of the readily polymerizable nature of styrene, its preparation in a requisite degree of purity by ordinary distillation methods presents considerable difficulty. Relatively complicated and expensive methods are, therefore, frequently employed for obtaining styrene of a high degree of purity.

This invention has for its principal object the provision of a method for the recovery of relatively pure styrene from such crude styrene mixtures with a minimum of difficulty and a minimum of degradation of the styrene product itself.

This invention is based upon the discovery that substantially pure styrene can be recovered readily from crude styrene by simple distillation methods conducted in the presence of a properly selected distillation assistant. Such a distillation assistant should be capable of forming constant boiling mixtures with styrene which are considerably higher boiling than those formed with the usual contaminants present in crude styrene. In general, among those distillation assistants which may be used, it is preferable to use those members which permit of a similar separation by water. In general, any polar compound boiling within the range of 90° to 250° C., and preferably one which is water soluble, can be used to effect the separation. We have found that ethyl Cellosolve, (glycol mono-ethyl ether) is particularly useful in this connection, is soluble in water and can be separated readily from the various products of distillation. The amount of the distillation assistant which will be added depends upon the amount of contaminant present in the charge mixture and upon the nature of the distillation assistant used. Usually the quantity of assistant required varies between 25% and 250% by volume of the contaminants in the crude styrene.

The process for the separation is shown by the single diagrammatic figure of the drawing attached hereto.

The effect of the presence of ethyl Cellosolve as a distillation assistant may be indicated by the following operations conducted in batch at atmospheric pressure. In each case the charge mixture consisted of a mixture of 60% by weight of ethyl benzene and 40% by weight of styrene. In each case the distillations were conducted in batch at atmospheric pressure employing a fractionating column of about eleven theoretical plates. In the first case in the absence of the distillation assistant, the recovery of condensed product commenced at a tower top temperature of 272° F. and the distillation was conducted until 50% of the still charge had been recovered as an overhead product, at which time the tower top temperature had risen to 279° F., and the distillation was stopped because the material in the still became polymerized. The last 10% of the material collected as overhead distillate was 92.5% ethyl benzene and 7.5% styrene and styrene was present in all portions of the overhead product except the first 10% of the still charge taken overhead. It will be seen that from the standpoint of recovering styrene, this distillation was an absolute failure since practically all of the styrene remained in the still and had become polymerized at the time distillation was stopped. In a second operation, the same mixture of ethyl benzene and styrene was used, and the same still was used except that the still charge consisted of one part of the crude styrene mixture and one part of ethyl Cellosolve. In this case, distillation commenced at a tower top temperature of 250° F. and a total overhead of 79% by volume of the crude styrene charge (after separation of distillation assistant) was recovered. Of the overhead distillate, 40% was quite pure ethyl benzene and the last 19% taken overhead was unpolymerized styrene of 100% purity. The intermediate 20% of overhead product was a mixture of styrene and ethyl benzene in which the styrene was unpolymerized, which could be subjected to a second distillation with similar recoveries. The bottoms from this operation when separated from distillation assistant were found to be polymerized. In these two experiments, which differed only in the presence of ethyl Cellosolve in proper amount as a distillation assistant, it was found that the presence of this distillation assistant enabled the recovery of half of the styrene present in a pure state and of a further portion of the styrene present in an unpolymerized state still capable of recovery by similar treatment, while in the absence of the distillation assistant, no recovery of styrene could be made.

These operations do not, however, set forth the preferred form of our process for the recovery of styrene of high purity from such mixtures. The polymerization of styrene is a matter of time and temperature. We have found that by conducting a distillation at relatively reduced pressure and in the presense of a distillation assistant, distillation operations may be conducted for the recovery of styrene in a high state of purity without the loss of any styrene by polymerization.

For example, using the same crude styrene mixture containing 40% by weight of styrene and 60% by weight of ethyl benzene, adding an equal volume of ethyl Cellosolve, and distilling in a batch distillation, at a pressure of 55 mm. of mercury at the top of the fractionating column, using a fractionating column containing the equivalent of 27 theoretical fractionating plates, it was found that the first 51% taken overhead was substantially pure ethyl benzene having a refractive index of 1.492 ($N_D^{20}$) compared to a refractive index of 1.4958 for reagent grade ethyl benzene, that the next 25% taken overhead in this batch distillation consisted of a mixture of ethyl benzene and styrene and that the remainder of the charge in the still at the 75% recovered cut point was styrene having a refractive index of 1.5461 ($N_D^{20}$) against a refractive index of 1.5457 for reagent grade styrene. In other words, by combination of reduced pressure, and the use of a distillation assistant, of proper kind and proper amount, no styrene was degraded by polymerization and over 50% of the styrene present was directly recovered in a high state of purity, the remainder being contained in a mixture not unlike the original charge. Additionally, the method of operation was an exceedingly simple one involving the use only of materials capable of ready and effective separation from the distillation products. It did not involve the introduction into the distillation products of anything of the nature of an inhibitor which might later require costly removal or interfere with the further use of the styrene product.

In its most effective form, this process may be conducted as a continuous operation in a column of high fractionating efficiency from which relatively pure styrene containing some of the distillation assistant may be withdrawn at the bottom and the contaminants together with distillation assistant may be withdrawn at the top, each product to be freed of distillation assistant by scrubbing with water. The distillation assistant may then be removed from the water by distillation and returned to the process as is usual in such operations.

We claim:

1. That method of recovering relatively pure styrene from crude mixtures comprising styrene and contaminants of similar boiling point, primarily ethyl benzene, which consists of subjecting a mixture containing crude styrene to distillation in the presence of glycol monoethyl ether as a distillation assistant, recovering from said distillation at least two fractions, one consisting of substantially pure styrene and some of the distillation assistant and the other consisting of a mixture of contaminants and distillation assistant and separating the distillation assistant from the styrene containing fraction.

2. That method of recovering relatively pure styrene from crude mixtures comprising styrene and contaminants of similar boiling point, primarily ethyl benzene, which consists of subjecting a mixture containing crude styrene to distillation in the presence of glycol mono-ethyl ether to the extent of not less than 25% by volume of the crude styrene mixture, recovering from said distillation at least two fractions, one consisting of substantially pure styrene and some of the distillation assistant and the other consisting of a mixture of contaminants and distillation assistant and separating the distillation assistant from the styrene containing fraction.

3. That method of recovering relatively pure styrene from crude mixtures comprising styrene and contaminants of similar boiling point, primarily ethyl benzene, which consists of subjecting a mixture containing crude styrene to distillation under pressure substantially less than atmospheric in the presence of glycol mono-ethyl ether as a distillation assistant, recovering from said distillation at least two fractions, one consisting of substantially pure styrene and some of the distillation assistant and the other consisting of a mixture of contaminants and distillation assistant from the styrene containing fraction.

4. That method of recovering relatively pure styrene from crude mixtures comprising styrene and contaminants of similar boiling point, primarily ethyl benzene, which consists of subjecting a mixture containing crude styrene to distillation under pressure substantially less than atmospheric in the presence of glycol mono-ethyl ether to the extent of not less than 25% by volume of the crude styrene mixture, recovering from said distillation at least two fractions, one consisting of substantially pure styrene and some of the distillation assistant and the other consisting of a mixture of contaminants and distillation assistant and separating the distillation assistant from the styrene containing fraction.

5. The process of recovering a concentrated styrene fraction from a mixture thereof primarily with ethyl benzene which comprises subjecting such mixture to azeotropic distillation in the presence of ethylene glycol mono-ethyl ether, removing as the overhead from such distillation, a binary azeotrope primarily of ethyl benzene and the ethylene glycol mono-ethyl ether and recovering the concentrated styrene fraction from such distillation.

THEODOR A. PETRY.
GRADY L. PAYNE.

Disclaimer 2,411,106.—*Theodor A. Petry*, Wenonah, and *Grady L. Payne*, Clarksboro, N. J. SEPARATION OF STYRENE FROM ETHYL BENZENE BY AZEOTROPIC DISTILLATION. Patent dated Nov. 12, 1946. Disclaimer filed July 23, 1948, by the assignee, *Socony-Vacuum Oil Company, Incorporated*.

Hereby enters this disclaimer to claims 1, 2, 3, 4, and 5.

[*Official Gazette August 17, 1948.*]